United States Patent
Ziskovsky et al.

(10) Patent No.: US 9,638,310 B2
(45) Date of Patent: May 2, 2017

(54) DRIVE ASSEMBLY WITH A ROTATING HOUSING ATTACHED TO AN OUTPUT INTERFACE

(71) Applicant: Deere & Company, Moline, IL (US)

(72) Inventors: Darren J. Ziskovsky, Independence, KS (US); Steven R. Fliearman, Coffeyville, KS (US); Jeffrey S. Turner, Coffeyville, KS (US); Kyle K. McKinzie, Altamont, KS (US); Austin B. Stephens, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/218,117

(22) Filed: Jul. 25, 2016

(65) Prior Publication Data

US 2016/0377163 A1    Dec. 29, 2016

Related U.S. Application Data

(63) Continuation-in-part of application No. 14/754,515, filed on Jun. 29, 2015.

(51) Int. Cl.
*F16H 57/08* (2006.01)
*F16H 57/02* (2012.01)
*F16H 1/28* (2006.01)

(52) U.S. Cl.
CPC ............... *F16H 57/02* (2013.01); *F16H 1/28* (2013.01); *F16H 2057/02017* (2013.01)

(58) Field of Classification Search
CPC ...... F16H 57/02; F16H 1/32; F16H 2001/324; F16H 2057/02017; B60K 17/08; B60K 1/00

See application file for complete search history.

(56) References Cited

U.S. PATENT DOCUMENTS

| 3,414,096 A | 12/1968 | Reed |
| 4,230,211 A * | 10/1980 | Goto ..................... F16D 41/088 192/35 |

(Continued)

FOREIGN PATENT DOCUMENTS

| DE | 102008045847 A1 | 3/2010 |
| SU | 521412 | 7/1976 |

OTHER PUBLICATIONS

Felsomat GMBH, Planet Carrier, Felsomat GmbH 2015, http://www.felsomat.de/en/technologies/work-pieces/transmission/planet-carrier/ (accessed Jul. 22, 2016).

*Primary Examiner* — David J Hlavka

(57) ABSTRACT

A drive assembly is disclosed, including a housing cylinder having a cap end and an attachment end including a first attachment surface, with gear teeth being disposed around an inner circumference forming at least one ring gear. The housing cylinder encloses a planetary gear set including at least one sun gear and at least one set of planet gears. An output interface includes an interface body having an annular attachment lip including a second attachment surface. The first attachment surface contacts, and is connected, as by welding, to the second attachment surface, whereby rotational power may be transmitted from the planetary gear set to the output interface via the gear teeth and the contact between the attachment surfaces.

3 Claims, 6 Drawing Sheets

(56) References Cited

U.S. PATENT DOCUMENTS

| | | | |
|---|---|---|---|
| 4,262,785 A * | 4/1981 | Anderson | F16D 41/00 |
| | | | 192/35 |
| 4,271,725 A | 6/1981 | Takao et al. | |
| 4,361,216 A * | 11/1982 | Overbeek | F16D 41/105 |
| | | | 192/36 |
| 5,916,056 A | 6/1999 | Okada | |
| 7,559,867 B2 | 7/2009 | Seki et al. | |
| 7,975,789 B2 | 7/2011 | Murata | |
| 8,025,116 B2 | 9/2011 | Rogg | |
| 8,182,387 B2 | 5/2012 | Fujii et al. | |
| 8,287,421 B2 | 10/2012 | Ciszak et al. | |
| 8,403,794 B2 | 3/2013 | Suzuki | |
| 8,505,658 B2 | 8/2013 | Wargh et al. | |
| 8,684,879 B2 | 4/2014 | Nakamura | |
| 9,121,488 B2 | 9/2015 | Magiera et al. | |
| 2005/0236198 A1 | 10/2005 | Jenkins | |
| 2007/0197340 A1 | 8/2007 | Kim et al. | |
| 2013/0009450 A1 | 1/2013 | Suzuki et al. | |
| 2013/0119748 A1 | 5/2013 | Yamamoto | |

\* cited by examiner

DRIVE ASSEMBLY WITH A ROTATING HOUSING ATTACHED TO AN OUTPUT INTERFACE

RELATED APPLICATIONS

This application is a continuation-in-part) of U.S. application Ser. No. 14/754,515, titled DRIVE ASSEMBLY WITH A ROTATING HOUSING ATTACHED TO AN OUPUT INTERFACE, filed Jun. 29, 2015, which is hereby incorporated by reference in its entirety.

TECHNICAL FIELD

The present application relates generally to drive assemblies for transmitting rotational power from a motor to an output hub by way of a cylindrical housing containing a planetary gear arrangement including a ring gear fixed for rotation with the housing.

BACKGROUND

In various applications, a drive assembly may be utilized to provide rotational power to various components. In tracked vehicles, for example, a final drive assembly may be mounted to a frame of the vehicle in order to provide rotational power, at an output hub of the drive assembly to drive the tracks of the vehicles and thereby move the vehicles over terrain. Such a drive assembly may include motors (electrical or hydraulic, for example) for providing rotational power, and planetary drive systems including various gears for adjusting the speed of the rotational power output at the output hub.

Known designs for drive assemblies may exhibit various characteristics that result in relatively large manufacturing costs for the drive assemblies. For example, a prior art drive assembly may include a motor mounted at a first end of the drive assembly, and a housing at a second end of the drive assembly. The housing may be integrally formed with an output hub, which may be attached to an external device, such as a wheel or sprocket, in order to provide rotational power from the motor to the external device. A planetary gear set is coupled to the motor and is disposed within the housing in order to provide a speed reduction of various ratios to rotational power received from the motor. The planetary gear set includes a rotating planetary ring gear. Traditional applications of a rotating planetary ring gear utilize either a two-piece assembly wherein a steel ring gear is pressed along a full length of the ring gear into an adjacent cast or ductile iron, or steel housing, or utilize a one-piece housing manufactured out of gear steel, which in some applications will require the ring gear teeth to be shaper cut.

A drawback of the known two-piece assembly (cast or ductile iron housing plus steel ring gear) is that an external housing is required for the ring gear to be placed into, and a drawback of the one-piece housing is that shaper cutting the gear teeth is a relatively costly manner of making the gear teeth.

SUMMARY OF THE DISCLOSURE

A drive assembly is disclosed for transmission of power from a power source, such as a motor, to an output interface.

According to one aspect of the disclosure, a housing cylinder includes a cap end, an attachment end with a first attachment surface, and gear teeth disposed around an inner circumference to form at least one ring gear. A planetary gear set may be surrounded by the housing cylinder and includes at least one sun gear and at least one set of planet gears. The planet gears may be supported by at least one planet gear carrier, rotated by the at least one sun gear and meshed with the at least one ring gear. An output interface may include an annular attachment lip with a second attachment surface. The housing cylinder may be attached to the attachment lip for operation of the drive assembly via the second attachment surface being connected to the first attachment surface, with the cap end of the housing cylinder being axially spaced from an axial end of the attachment lip. Rotational power may be transmitted from the planetary gear set to the output interface via the gear teeth and the connection between the attachment surfaces.

In certain embodiments, one of the attachment surfaces may include a self-cutting spline interface. The attachment lip or the attachment end of the housing cylinder may include a chamfer or groove to receive debris generated by formation of a splined connection by the self-cutting spline interface. The connection between the first attachment surface of the housing cylinder and the second attachment surface of the attachment lip may be provided by an interference fit connection or a shrink fit connection between the attachment end of the housing cylinder and the attachment lip. Alternatively, the connection between the first attachment surface of the housing cylinder and the second attachment surface of the attachment lip of the output interface may be in the form of an annular ring of welding material formed between attachment surface and attachment lip.

The details of one or more embodiments are set forth in the accompanying drawings and the description below. Other features and advantages will become apparent from the description, the drawings, and the claims.

BRIEF DESCRIPTION OF THE DRAWINGS

The detailed description of the drawings refers to the accompanying figures in which.

Like reference symbols in the various drawings indicate like elements.

DETAILED DESCRIPTION OF THE DRAWINGS

Figure 1:
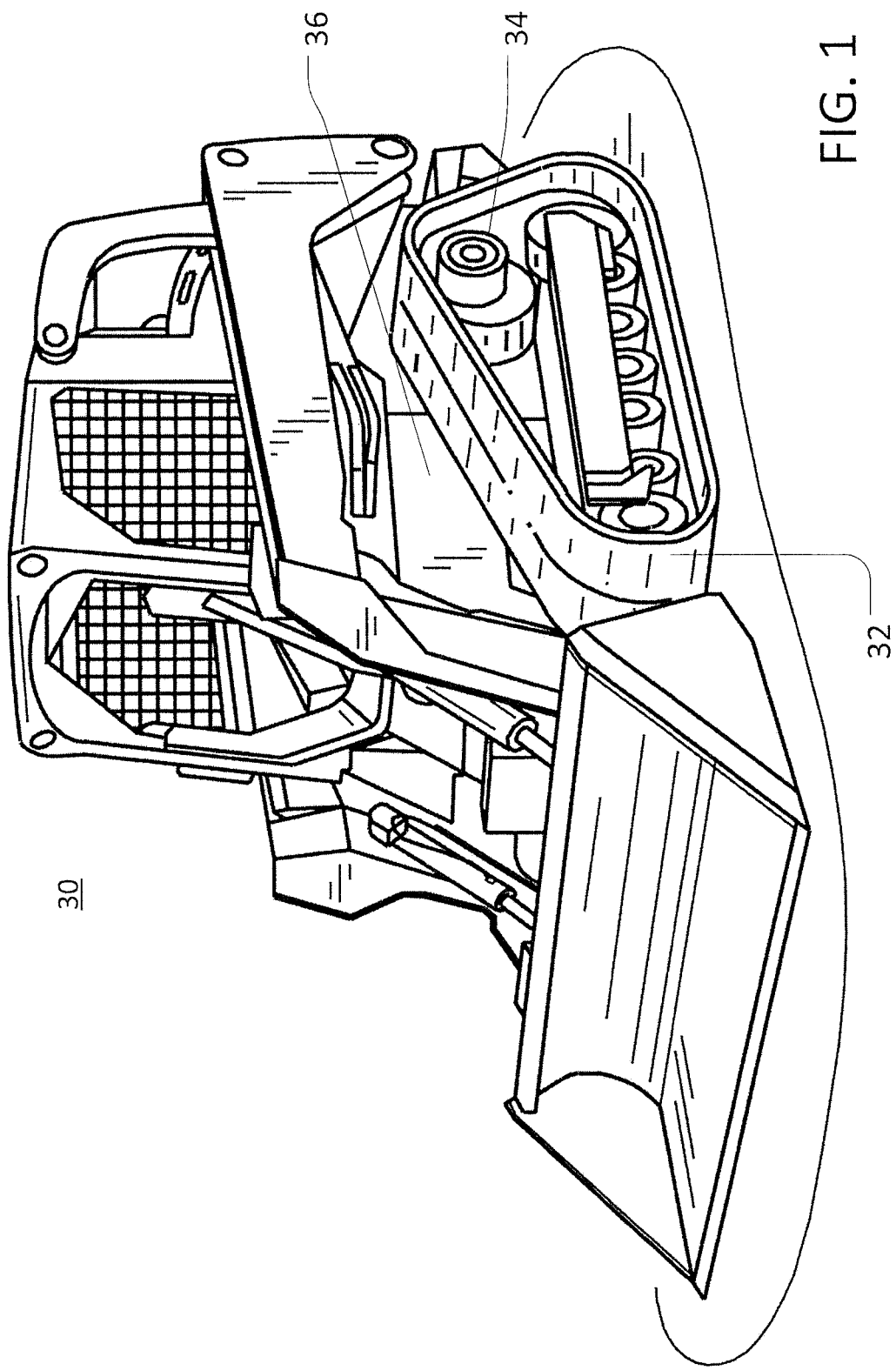
FIG. 1 is perspective view of an example vehicle with which a drive assembly according to the present disclosure may be implemented.

The following describes one or more example embodiments of the disclosed drive assembly, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft.

Also as used herein, "radially" aligned may refer to two components that are both disposed along a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

As also noted above, known designs for drive assemblies may exhibit various characteristics that result in relatively large manufacturing costs for the drive assemblies. For example, a prior art drive assembly (not shown) may include a motor mounted at a first end of the drive assembly, and a housing at a second end of the drive assembly. The housing may be integrally formed with a hub, which may be attached to an external device, such as a wheel or sprocket, in order to provide rotational power from the motor to the external device. A planetary gear set in communication with the motor may be disposed within the housing in order to provide a speed reduction of various ratios to rotational power received from the motor. The planetary gear set may engage the housing via a ring gear, which may be press fit into, or welded to, the housing. In this way, rotational power from the motor may be transmitted through the planetary gear set to the housing in order to rotate the hub.

In known designs, the housing may be integrally formed with the hub and extends from the hub to the second end of the drive assembly. At the second end of the drive assembly, an end cap may be attached to the housing in order to close off the interior of the housing and thereby enclose and protect the planetary gear set and other components. As a result of this configuration, the housing may generally exhibit a relatively long and heavy profile, with the planetary gear set (including the ring gear) and the end cap being radially aligned with (and contained within) the housing.

The configuration of such a drive assembly (and similar configurations) may introduce various costs to manufacturing. For example, a relatively large quantity of the material may be required for the housing to extend fully from the hub to the end cap. This may impose relatively significant material costs on the manufacture of the drive assembly. As another example, a spacer may be required in order to hold the ring gear in place within the housing. The spacer may also impose relatively significant material costs on the manufacture of the drive assembly.

Aside from the amount of material required for such a housing (and in similar configurations), the expected loads and stresses on the housing may generally require the use of relatively expensive materials and manufacturing techniques for the formation of the housing (and related components).

Other issues may arise beyond material costs. For example, due to the configuration of such a housing, and the location of the ring gear, the housing may require relatively precise machining in order to ensure an appropriate fit with the ring gear. Further, it may be necessary to form the teeth of the ring gear by way of relatively expensive and time-consuming manufacturing methods, such as individual shaper cuts.

The disclosed drive assembly may address several of the issues noted above, as well as provide various additional benefits. Generally, in place of the extended housing of known configurations described above (or similar other features), the disclosed drive assembly may include a relatively short attachment lip extending from the output hub (or other output interface). A separate housing may be formed with an integrally (or similarly) formed ring gear interface around an internal circumference of the housing. The housing may then be press fit, shrink fit, or otherwise attached to the lip. Gears of a gear set contained by the housing may mesh with the ring gear interface in order to deliver rotational power to the housing from a motor (or other power source), and the attachment of the housing to the attachment lip may allow that power to be transmitted to the output hub for use by an external device.

Generally, by replacing the extended housing of known configurations (or similar other features) with an attachment lip for attaching a separate housing to an output interface, a significant amount of material and expense may be saved in manufacturing the drive assembly. Further, due to the separate housing and lip configuration, more inexpensive manufacturing techniques, such as broaching, may be utilized to form the ring gear interface for the housing.

The disclosed drive assembly may be utilized with an example vehicle 30, as shown in FIG. 1. As depicted, the vehicle 30 is a compact track loader with ground-engaging tracks 32. An example drive assembly 34 is configured as a final drive assembly that is mounted to a frame 36 of the vehicle 30 in order to provide motive power to the tracks 32.

It will be understood that the depicted vehicle 30 is presented as an example only, and that the disclosed drive assembly (e.g., the drive assembly 34) may be utilized with other vehicles (or other machines). Further, it will be understood that the disclosed drive assembly may be utilized as a final drive assembly (e.g., as depicted for the drive assembly 34) for providing motive power to a ground-engaging element (e.g., wheels, etc.) of a vehicle, or may be utilized to provide rotational power to other types of devices.

Figure 2:
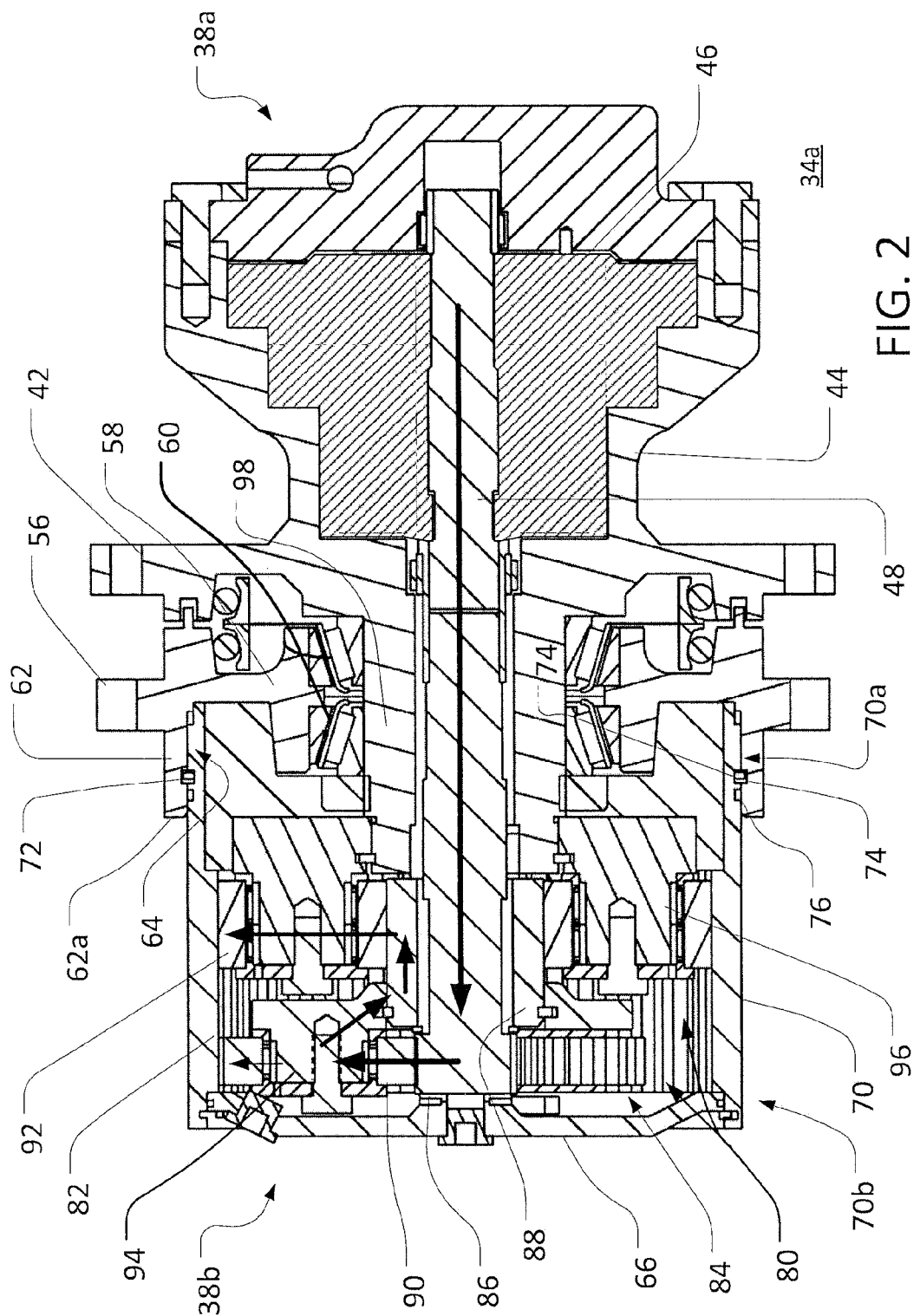
FIG. 2 is a side sectional view of an example drive assembly according to the present disclosure, for use with the vehicle of FIG. 1.

Referring also to FIG. 2, an example configuration of the drive assembly 34 is presented as a drive assembly 34a. Various components (or assemblies) of the drive assembly 34a may generally exhibit radial symmetry, such that for these components the sectional view depicted in FIG. 2 may represent a view of any number of diametric planes through the drive assembly 34a. In certain embodiments, the disclosed drive assembly may exhibit various radial asymmetries.

As depicted, the drive assembly 34a includes a mounting hub 42 configured for attachment to the frame 36 of the vehicle 30. As such, the drive assembly 34a may be utilized as a final drive assembly for driving the tracks 32 of the vehicle 30. In certain embodiments, the drive assembly 34a (or other similar drive assemblies) may be utilized as a final drive assembly for other vehicles, or as a source of rotational power for various other vehicles or machines.

The mounting hub 42 is included as part of a larger mounting structure 44 for the drive assembly 34a, which may be generally configured to remain relatively stationary during operation of the drive assembly 34a. A motor 46 may be attached to the mounting structure 44 (and, thereby, to the mounting hub 42) at one axial end 38a of the drive assembly 34a, such that the motor 46 may be held in an appropriately stationary orientation for delivery of rotational power to various external devices (e.g., the tracks 32 of FIG. 1). In FIG. 2, the motor 46 is configured as a hydraulic motor with a brake assembly (not shown), and an output shaft 48 extending towards another axial end 38b of the drive assembly 34a. In other embodiments, other configurations may be possible. For example, in certain embodiments, the motor 46 may be configured as an electric motor. In certain embodiments, a non-motor power source may be utilized. For example, the mounting structure 44 may be configured to receive a power input (e.g., an input shaft) from an external power source such as an engine.

The drive assembly 34a may further include an output interface. As depicted, the output interface is configured as an output hub 56, although other configurations may be possible. Generally, the output hub 56 includes a hub body 58, which may extend within the drive assembly 34a to rest on various bearings 60. The output hub 56 also includes an annular attachment lip 62, which extends from the hub body 58, towards the axial end 38b of the drive assembly 34a, to an axial end 62a of the attachment lip 62. Generally, the attachment lip 62 may define an undercut 64, such that an open space is provided radially inside the attachment lip 62.

As depicted, the output hub 56 is configured to engage (directly or indirectly) the tracks 32 of the vehicle 30, such that rotation of the output hub 56 may drive movement of the tracks 32 and, thereby, movement of the vehicle 30. In other embodiments, other output interfaces may be utilized to engage with the tracks 32 or other external devices.

The drive assembly 34a may further include a housing, such as the housing cylinder 70. Generally, the housing of the disclosed drive assembly may be configured to engage with an attachment lip of the relevant output interface, such that rotational power may be transmitted from the housing to the output interface via co-rotation (i.e., rotation in unison) of the housing and the output interface. As depicted, for example, the housing cylinder 70 includes a hub end 70a, which is configured to attach to the output hub 56 via the attachment lip 62. The housing cylinder 70 also includes a cap end 70b, to which an end cap 66 is attached.

The hub end 70a of the housing cylinder 70 may be configured to attach to the attachment lip 62 in various ways, as discussed in greater detail below. In certain embodiments, an inner diameter of the attachment lip 62 and an outer diameter of the hub end 70a of the housing cylinder 70 may be configured such that an appropriately strong diametral interference (e.g., press) fit may be formed between the housing cylinder 70 and the output hub 56, when the hub end 70a of the housing cylinder 70 is inserted into the undercut 64 (i.e., is surrounded by the attachment lip 62). In certain embodiments, shrink fit techniques may be utilized. For example, the attachment lip 62 may be expanded radially outward through heating, and the hub end 70a of the housing cylinder 70 may be inserted into the undercut 64. As the attachment lip 62 cools, an appropriately strong attachment may be thereby formed between the housing cylinder 70 and the output hub 56. In certain embodiments, the attachment lip 62 or the housing cylinder 70 may be manufactured with self-cutting splines (see, e.g., FIGS. 6A and 6B), such that a splined connection between the housing cylinder 70 and the output hub 56 may be formed when the hub end 70a of the housing cylinder 70 is inserted into the undercut 64.

In certain embodiments, a snap ring 72 (or other retaining ring) may be seated within grooves 74 in the attachment lip 62 and the hub end 70a of the housing cylinder 70. For example, the snap ring 72 may be captured within the grooves 74 during a shrink fit operation for attaching the housing cylinder 70 to the attachment lip 62. In this way, the snap ring 72 (or other retaining ring) may provide axial retention force with respect to the attachment of the output hub 56 and the housing cylinder 70, with the direct engagement of the facing surfaces of the attachment lip 62 and the hub end 70a of the housing cylinder 70 carrying torque loads during operation of the drive assembly 34a. In certain embodiments, an O-ring 76 (or other seal) may be utilized in order to provide additional sealing between the attachment lip 62 and the housing cylinder 70.

As depicted, the undercut 64 defined by the attachment lip 62 provides a point of insertion for the hub end 70a of the housing cylinder 70. The housing cylinder 70 may accordingly be attached to the mounting hub 42 by inserting the hub end 70a of the housing cylinder 70 into the undercut 64, with the attachment lip 62 generally surrounding (i.e., being radially aligned with and outside of) the hub end 70a of the housing cylinder 70. In certain embodiments, a somewhat reversed configuration (not shown) may be utilized. For example, the hub end 70a of the housing cylinder may be configured to slide over (i.e., radially outside of) the attachment lip 62 in order to attach the housing cylinder 70 to the output hub 56. As such, in certain embodiments, the output hub 56 may be attached to the housing cylinder 70 with the hub end 70a of the housing cylinder generally surrounding (i.e., being radially aligned with and outside of) the attachment lip 62. In such a configuration, similar attachment means and other considerations discussed above may apply, but with an inner surface of the housing cylinder 70 contacting an outer surface of the attachment lip 62, rather than vice versa.

In certain embodiments, the output hub 56 and the housing cylinder 70 may be formed from different materials, or may be formed in different ways. For example, the output hub 56 may be formed from cast iron, whereas the housing cylinder 70 may be formed from steel (or other metal) tubing. This may result in relatively significant reduction in costs as compared to known drive assembly designs.

Rotational power may be transmitted in various ways from the motor 46 to the housing cylinder 70 and thereby, via the attachment between the attachment lip 62 and the hub end 70a of the housing cylinder 70, to the output hub 56. As depicted, a series of teeth 80 may be integrally (or otherwise) formed on an interior circumference of the housing cylinder 70, such that the housing cylinder 70 includes an interior ring gear interface 82. A gear set (e.g., a planetary gear set) utilizing the ring gear interface 82 may then be disposed within the housing cylinder 70 in order to provide an appropriate speed reduction between the rotation of the output shaft 48 (e.g., as powered by the motor 46) and the rotation of the housing cylinder 70 (e.g., as powers rotation of the output hub 56 and, thereby, the relevant external device).

As depicted, the drive assembly 34a includes an example double planetary gear set 84, with sun gears 86 and 88, sets of planet gears 90 and 92, and planet gear carriers 94 and 96. The planet gears 90 are meshed with the sun gear 86 and with the ring gear interface 82. The planet gears 92 are meshed with the sun gear 88 and with the ring gear interface 82. The planet gear carrier 94 is fixed to (e.g., secured to or integrally formed with) the sun gear 88, and the planet gear carrier 96 is fixed to (e.g., secured to or integrally formed with) an extended neck 98 of the mounting structure 44. With such a configuration, the sun gear 88 may be rotated by the planet gear carrier 88, via movement of the planet gears 90 around the sun gear 86, while the axes of rotation of the various planet gears 92 may be fixed in place via the connection between the planet gear carrier 96 and the neck 98. It will be understood, however, that other configurations may be possible. It will also be understood that the disclose drive assembly may be considered as capable of providing power transmission with a planetary (or other) gear set that excludes a separate ring gear component other than the ring gear interface provided by the housing cylinder. Thus, for example, the planetary gear set may include only one or more of each of a sun gear, planet gears, planet carrier, and or connecting pinion shafts, without a separate ring gear. Alternatively, the planet (or other) gear set may include a separate ring gear in addition to the ring gear(s) formed in the housing cylinder.

With the depicted planetary gear set 84, rotational power may be routed from the motor 46 to the housing cylinder 70 as indicated by the unnumbered arrows of FIG. 2. For example, when the sun gear 86 is rotated by the motor 46 (i.e., via the output shaft 48) rotational power is transmitted by the sun gear 86, through the planet gears 90, both to the sun gear 88 (via the planet gear carrier 94) and to the housing cylinder 70 (via the ring gear interface 82). Rotational power received at the sun gear 88 is further transmitted to the housing cylinder 70 via the planet gears 92 (as facilitated by the fixed connection between the planet gear carrier 96 and the neck 98) and the ring gear interface 82. Due to the attachment between the housing cylinder 70 and the output hub 56 (e.g., as described in greater detail above), rotational power from the housing cylinder 70 may then be transmitted to the output hub 56 and, thereby, to the relevant external device.

As depicted, the ring gear interface 82 is disposed on the housing cylinder 70 such that, when the hub end 70a of the housing cylinder 70 is attached to the output hub 56 via the attachment lip 62, the ring gear interface 82 is not radially aligned (i.e., does not axially overlap) with the attachment lip 62. Further, the planetary gear set 84 is configured such that the various gears 86, 88, 90, and 92 are also not radially aligned with the attachment lip 62, when the housing cylinder 70 is attached to the output hub 56. In other embodiments, other configurations may be possible.

Figure 3:
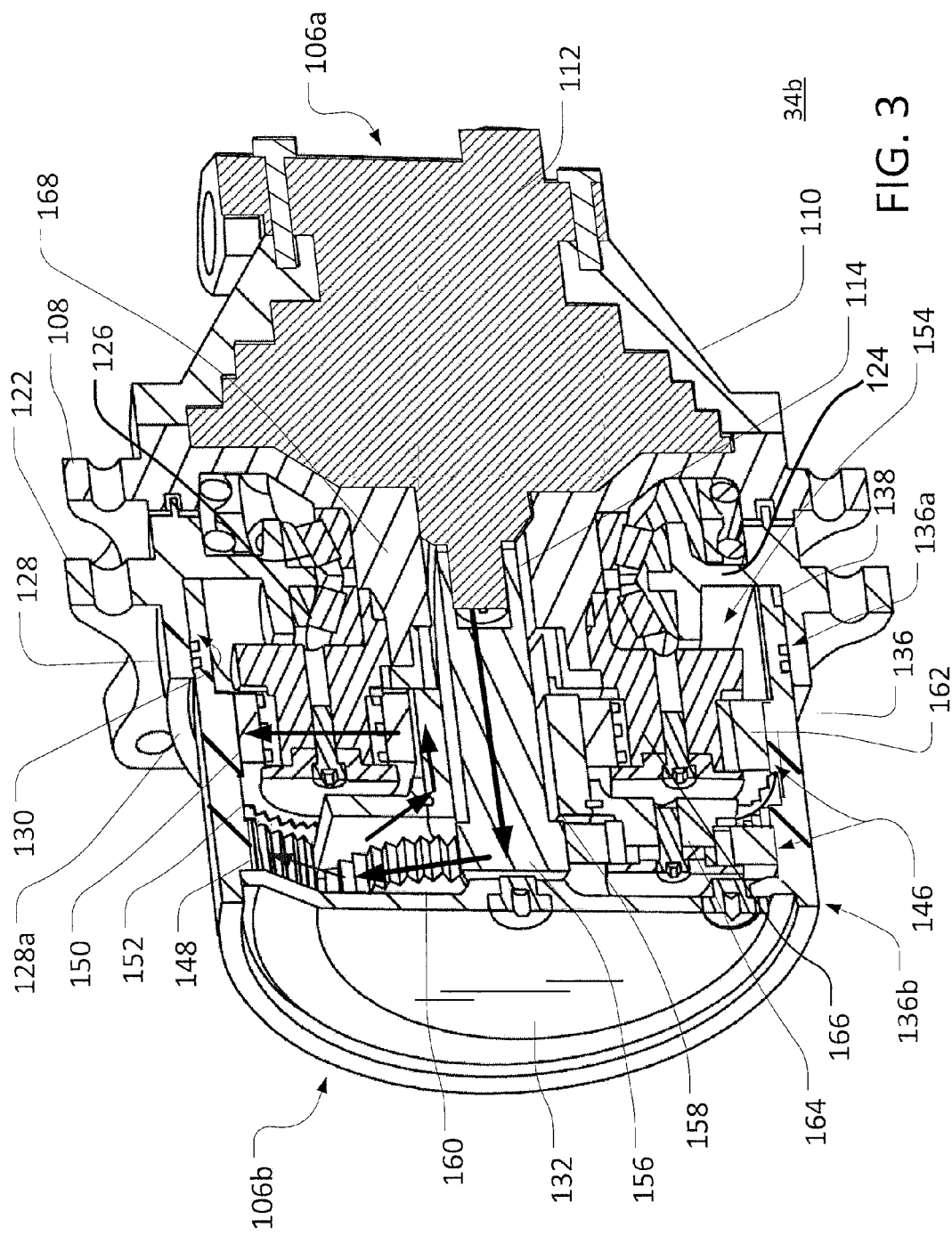
FIG. 3 is a perspective, sectional view of another example drive assembly according to the present disclosure, for use with the vehicle of FIG. 1.

Referring also to FIG. 3, another example configuration of the drive assembly 34 is presented as a drive assembly 34b. Various components (or assemblies) of the drive assembly 34b may generally exhibit radial symmetry. As noted above, in certain embodiments, the disclosed drive assembly may exhibit various radial asymmetries.

As depicted, the drive assembly 34b includes a mounting hub 108 configured for attachment to the frame 36 of the vehicle 30. As such, the drive assembly 34b may be utilized as a final drive assembly for driving the tracks 32 of the vehicle 30. In certain embodiments, the drive assembly 34b (or other similar drive assemblies) may be utilized as a final drive assembly for other vehicles, or as a source of rotational power for various other vehicles or machines.

The mounting hub 108 is included as part of a larger mounting structure 110 for the drive assembly 34b, which may be generally configured to remain relatively stationary during operation of the drive assembly 34b. A motor 112 may be attached to the mounting structure 110 (and, thereby, to the mounting hub 108) at one axial end 106a of the drive assembly 34b, such that the motor 112 may be held in an appropriately stationary orientation for delivery of rotational power to various external devices (e.g., the tracks 32 of FIG. 1). In FIG. 3, the motor 112 is configured as a hydraulic motor with a brake assembly (not shown), and an output shaft 114 extending towards another axial end 106b of the drive assembly 34b. In other embodiments, other configurations may be possible.

The drive assembly 34b may further include an output interface. As depicted, the output interface is configured as an output hub 122, although other configurations may be possible. Generally, the output hub 122 includes a hub body 124, which may extend within the drive assembly 34b to rest on various bearings 126. The output hub 122 also includes an attachment lip 128, which extends from the hub body 124, towards the axial end 106b of the drive assembly 34b, to an axial end 128a of the attachment lip 128. Generally, the attachment lip 128 may define an undercut 130, such that an open space is provided radially inside the attachment lip 128.

As depicted, the output hub 122 is configured to engage (directly or indirectly) the tracks 32 of the vehicle 30, such that rotation of the output hub 122 may drive movement of the tracks 32 and, thereby, movement of the vehicle 30. In other embodiments, other output interfaces may be utilized to engage with the tracks 32 or other external devices.

The drive assembly 34b may further include a housing, such as the housing cylinder 136. Generally, the housing of the disclosed drive assembly may be configured to engage with an attachment lip of the relevant output interface, such that rotational power may be transmitted from the housing to the output interface via co-rotation (i.e., rotation in unison) of the housing and the output interface. As depicted, for example, the housing cylinder 136 includes a hub end 136a, which is configured to attach to the output hub 122 via the attachment lip 128. The housing cylinder 136 also includes a cap end 136b, to which an end cap 132 is attached.

The hub end 136a of the housing cylinder 136 may be configured to attach to the attachment lip 128 in various ways, as discussed in greater detail below. In certain embodiments, an inner diameter of the attachment lip 128 and an outer diameter of the hub end 136a of the housing cylinder 136 may be configured such that an appropriately strong diametral interference (e.g., press) fit may be formed between the housing cylinder 136 and the output hub 122, when the hub end 136a of the housing cylinder 136 is inserted into the undercut 130 (i.e., is surrounded by the attachment lip 128). In certain embodiments, shrink fit techniques may be utilized. For example, the attachment lip 128 may be expanded radially outward through heating, and the hub end 136a of the housing cylinder 136 may be inserted into the undercut 130. As the attachment lip 128 cools, an appropriately strong attachment may be thereby formed between the housing cylinder 136 and the output hub 122. In certain embodiments, the attachment lip 128 or the housing cylinder 136 may be manufactured with self-cutting splines (see, e.g., FIGS. 6A and 6B), such that a splined connection between the housing cylinder 136 and the output hub 122 may be formed when the hub end 136a of the housing cylinder 136 is inserted into the undercut 130.

In certain embodiments, a groove or chamfer may be provided on the attachment lip 128 or the hub end 136a of the housing cylinder 136. For example, a groove or chamfer may be provided at an end of the attachment lip 128 or housing cylinder 136 that is closer to the end 106a of the drive assembly 34b. This may be useful, for example, in order to capture debris that is generated during the cutting of a splined interface, where one of the housing cylinder 136 or the attachment lip 128 includes self-cutting splines. As depicted, for example, a groove 138 is provided in the housing cylinder 136 at an end closer to the end 106a of the drive assembly 34b. In other embodiments, other configurations may be possible.

As depicted, the undercut 130 defined by the attachment lip 128 provides a point of insertion for the hub end 136a of the housing cylinder 136. The housing cylinder 136 may accordingly be attached to the mounting hub 108 by inserting the hub end 136a of the housing cylinder 136 into the undercut 130, with the attachment lip 128 generally surrounding (i.e., being radially aligned with and outside of) the hub end 136a of the housing cylinder 136. In certain embodiments, a somewhat reversed configuration (not shown) may be utilized. For example, the hub end 136a of the housing cylinder may be configured to slide over (i.e., radially outside of) the attachment lip 128 in order to attach the housing cylinder 136 to the output hub 122. As such, in certain embodiments, the output hub 122 may be attached to the housing cylinder 136 with the hub end 136a of the housing cylinder generally surrounding (i.e., being radially aligned with and outside of) the attachment lip 128. In such a configuration, similar attachment means and other considerations discussed above may apply, but with an inner surface of the housing cylinder 136 contacting an outer surface of the attachment lip 128, rather than vice versa.

In certain embodiments, the output hub 122 and the housing cylinder 136 may be formed from different materials, or may be formed in different ways. For example, the output hub 122 may be formed from cast iron, whereas the housing cylinder 136 may be formed from steel (or other metal) tubing. This may result in relatively significant reduction in costs as compared to known drive assembly designs.

Rotational power may be transmitted in various ways from the motor 112 to the housing cylinder 136 and thereby, via the attachment between the attachment lip 128 and the hub end 136a of the housing cylinder 136, to the output hub 122. As depicted, distinct sets of teeth 146 may be integrally (or otherwise) formed on an interior circumference of the housing cylinder 136, such that the housing cylinder 136 includes distinct interior ring gear interfaces 148 and 150, separated by a toothless region 152. A gear set (e.g., a planetary gear set) utilizing the ring gear interfaces 148 and 150 may then be disposed within the housing cylinder 136 in order to provide an appropriate speed reduction between the rotation of the output shaft 114 (e.g., as powered by the motor 112) and the rotation of the housing cylinder 136 (e.g., as powers rotation of the output hub 122 and, thereby, the relevant external device).

As depicted, the drive assembly 34b includes an example double planetary gear set 154, with sun gears 156 and 158, sets of planet gears 160 and 162, and planet gear carriers 164 and 166. The planet gears 160 are meshed with the sun gear 156 and with the ring gear interface 148. The planet gears 162 are meshed with the sun gear 158 and with the ring gear interface 150. The planet gear carrier 164 is fixed to (e.g., secured to or integrally formed with) the sun gear 158, and the planet gear carrier 166 is fixed to (e.g., secured to or integrally formed with) an extended neck 168 of the mounting structure 110. With such a configuration, the sun gear 158 may be rotated by the planet gear carrier 158, via movement of the planet gears 160 around the sun gear 156, while the axes of rotation of the various planet gears 162 may be fixed in place via the connection between the planet gear carrier 166 and the neck 168. It will be understood, however, that other configurations may be possible.

With the depicted planetary gear set 154, rotational power may be routed from the motor 112 to the housing cylinder 136 as indicated by the unnumbered arrows of FIG. 3. For example, when the sun gear 156 is rotated by the motor 112 (i.e., via the output shaft 114) rotational power is transmitted by the sun gear 156, through the planet gears 160, both to the sun gear 158 (via the planet gear carrier 164) and to the housing cylinder 136 (via the ring gear interface 148). Rotational power received at the sun gear 158 is further transmitted to the housing cylinder 136 via the planet gears 162 (as facilitated by the fixed connection between the planet gear carrier 166 and the neck 168) and the ring gear interface 150. Due to the attachment between the housing cylinder 136 and the output hub 122 (e.g., as described in greater detail above), rotational power from the housing cylinder 136 may then be transmitted to the output hub 122 and, thereby, to the relevant external device.

As depicted, the ring gear interfaces 148 and 150 are disposed on the housing cylinder 136 such that, when the hub end 136a of the housing cylinder 136 is attached to the output hub 122 via the attachment lip 128, the ring gear interfaces 148 and 150 are not radially aligned (i.e., do not axially overlap) with the attachment lip 128. Further, the planetary gear set 154 is configured such that the various gears 156, 158, 160, and 162 are also not radially aligned with the attachment lip 128, when the housing cylinder 136 is attached to the output hub 122. In other embodiments, other configurations may be possible.

Figure 4:
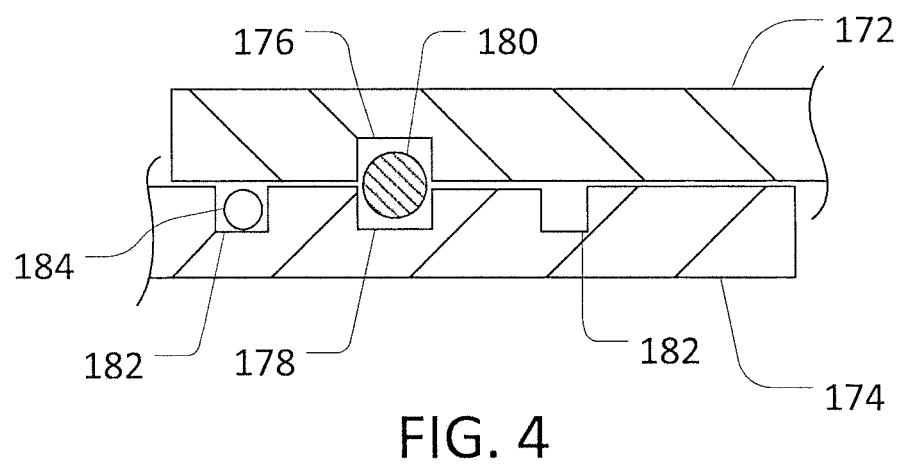
FIG. 4 is partial side sectional view of an example attachment structure for a housing and output hub of either of the drive assemblies of FIGS. 3 and 4.

Referring also to FIG. 4, a schematic sectional view is presented of the interface between another example attachment lip 172 (e.g., similar to the attachment lip 62 of FIG. 2) and another example housing cylinder 174 (e.g., similar to the housing cylinder 70 of FIG. 2). As depicted, the attachment lip 172 includes a groove 176 that corresponds to a similar groove 178 in the housing cylinder 174. A retaining ring 180 (e.g., a snap ring) may be seated in the grooves 176 and 178 when the housing cylinder 174 is attached to the attachment lip 172, such that the retaining ring 180 may provide axial retention force (e.g., left to right, as depicted in FIG. 4) for the relevant drive assembly.

As depicted the housing cylinder 174 also includes grooves 182 for O-rings 184 (or other seals), as may be useful to ensure an appropriate fluid seal between the internal cavity of the relevant drive assembly and the ambient environment. It will be understood that other configurations may be possible. For example, in certain embodiments, a different number of grooves and seals may be provided, or the grooves and seals may be disposed at different axial locations along the contact area between the housing cylinder 174 and the attachment lip 172. In certain embodiments, similar (or other) grooves and seals (not shown) may be provided on the attachment lip 172 instead of (or in addition to) on the housing cylinder 174.

Figure 5:
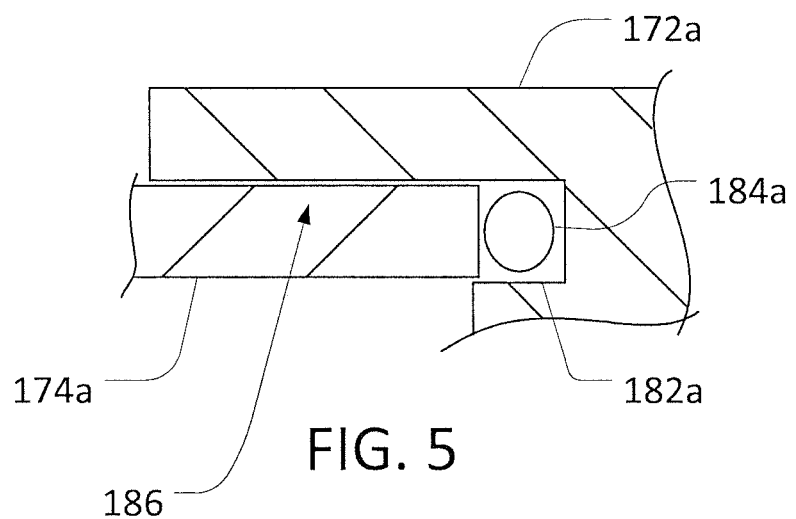
FIG. 5 is a partial side view of another example attachment structure for a housing and output hub of either of the drive assemblies of FIGS. 3 and 4.

In certain embodiments, sealing bodies, such as O-rings, may be disposed at other locations. As depicted in FIG. 5, for example, a groove 182a may be provided at the axial inner end of an undercut 186 of an attachment lip 172a, with the groove 182a sized to receive an O-ring 184a. When a housing cylinder 174a is inserted into the undercut 186, the axial end of the housing cylinder 174a may press against the O-ring 184a in order to provide a seal. In other embodiments, a similar groove (not shown) may be provided in the axial end of the housing cylinder 174a, such that the O-ring 184a may be seated within a groove on the housing cylinder 174*a* rather than (or in addition to) being seated within the grove 182*a* at the end of the undercut 186.

Figure 6A:
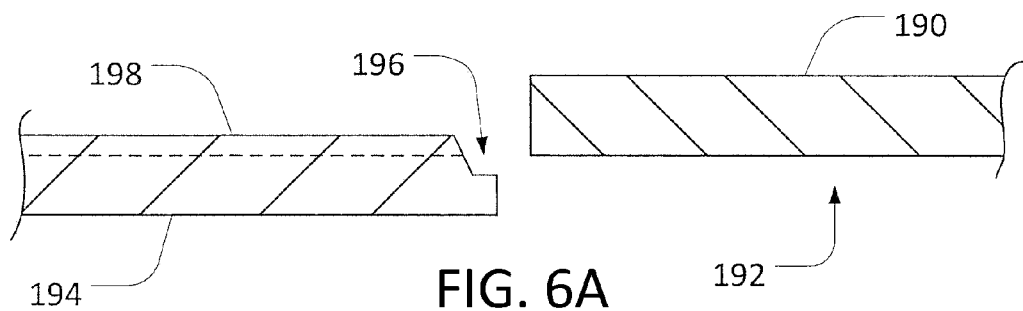
FIGS. 6A and 6B are partial side sectional views of another example attachment structure for the housing and output hub of either of the drive assemblies of FIGS. 3 and 4, shown disassembled in FIG. 6A.
Figure 6B:
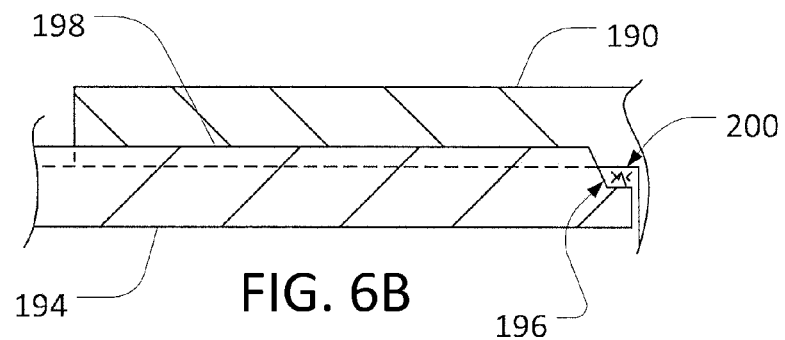

Referring also to FIGS. 6A and 6B, a schematic sectional view is presented of the interface between still another example attachment lip 190 with an undercut 192 (e.g., similar to the attachment lip 128 of FIG. 3) and another example housing cylinder 194 (e.g., similar to the housing cylinder 136 of FIG. 3). As depicted, the housing cylinder 194 includes a self-cutting spline 198, which may cut into the attachment lip 190 when the housing cylinder 194 is inserted into the undercut 192 (see FIG. 6B). In this way, a splined connection may be formed between the housing cylinder 194 and the attachment lip 190, without the need to separately form splines on the attachment lip 190 before insertion of the housing cylinder 194 into the undercut 192.

Also, as depicted, the housing cylinder 194 includes a chamfered groove 196 at one axial end (i.e. to the right in FIGS. 6A and 6B). This may be useful, for example, in order to capture various chips and other debris 200 that may be formed when the attachment lip 190 is cut by the self-cutting spline 198.

Figure 7:
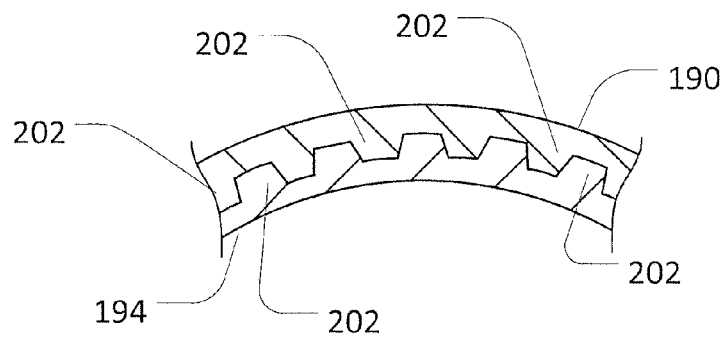
FIG. 7 is a partial end sectional view of the example attachment structure of FIGS. 6A and 6B.

An example of the splined connection formed between the housing cylinder 194 and the attachment lip 190 is depicted in FIG. 7. As depicted, the connection includes various involute splines 202. It will be understood, however, that other configurations may be possible. In certain embodiments, splines may be formed on the attachment lip 190 before the housing cylinder 194 is inserted into the undercut 192. In certain embodiments, self-cutting splines (not shown) may be included on the attachment lip 190, such that splines may be cut on the housing cylinder 194 by the attachment lip 190, when the housing cylinder 194 is inserted into the undercut 192.

Figure 8:
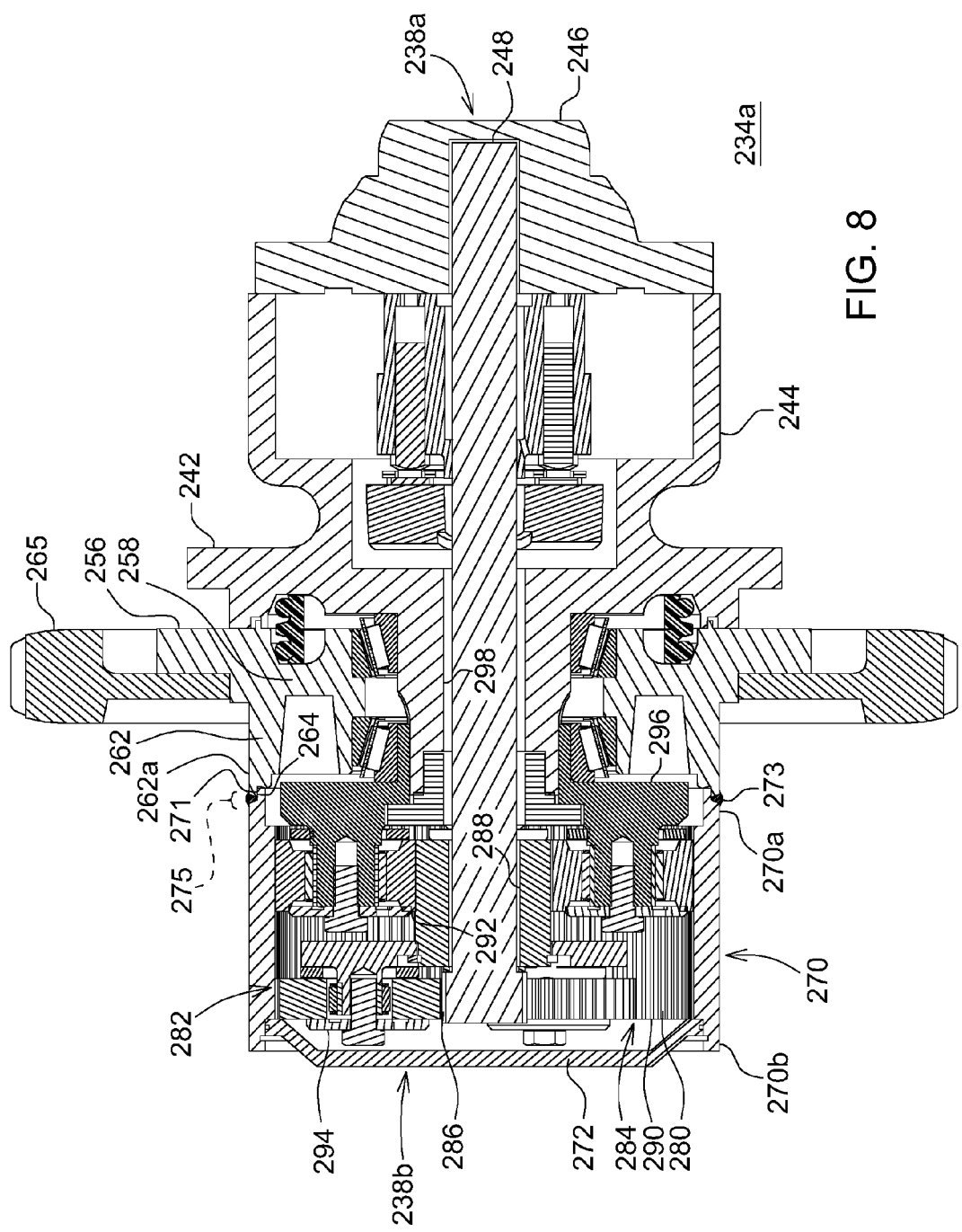
FIG. 8 is a side sectional view of a third example drive assembly according to the present disclosure, for use with the vehicle of FIG. 1.

Referring now to FIG. 8, a third example configuration of the final drive assembly 34 is presented as a drive assembly 234*a*. Various components (or assemblies) of the drive assembly 134*a* may generally exhibit radial symmetry, such that for these components the sectional view depicted in FIG. 8 may represent a view of any number of diametric planes through the drive assembly 234*a*. In certain embodiments, the disclosed drive assembly may exhibit various radial asymmetries.

As depicted, the drive assembly 234*a* includes a mounting hub 242 configured for attachment to the frame 36 of the vehicle 30. As such, the drive assembly 234*a* may be utilized as a final drive assembly for driving the tracks 32 of the vehicle 30. In certain embodiments, the drive assembly 234*a* (or other similar drive assemblies) may be utilized as a final drive assembly for other vehicles, or as a source of rotational power for various other vehicles or machines.

The mounting hub 242 is included as part of a larger mounting structure 244 for the drive assembly 234*a*, which may be generally configured to remain relatively stationary during operation of the drive assembly 234*a*. A motor 246 may be attached to the mounting structure 244 (and, thereby, to the mounting hub 242) at one axial end 38*a* of the drive assembly 234*a*, such that the motor 246 may be held in an appropriately stationary orientation for delivery of rotational power to various external devices (e.g., the tracks 32 of FIG. 1). In FIG. 8, the motor 246 is configured as a hydraulic motor with a brake assembly (not shown), and an output shaft 248 extending towards another axial end 238*b* of the drive assembly 234*a*. In other embodiments, other configurations may be possible. For example, in certain embodiments, the motor 246 may be configured as an electric motor. In certain embodiments, a non-motor power source may be utilized. For example, the mounting structure 244 may be configured to receive a power input (e.g., an input shaft) from an external power source such as an engine.

The drive assembly 234*a* may further include an output interface. As depicted, the output interface is configured as an output hub 256, although other configurations may be possible. Generally, the output hub 256 includes a hub body 258, which may extend radially within the drive assembly 234*a* to rest on a bearing arrangement 260, here shown as a double-row tapered roller bearing having inner races supported by a radially outer cylindrical surface of a hollow neck 298 extending axially from the mounting hub 242 toward the axial end 238*b* of the drive assembly 234*a*. The output hub 256 also includes an annular, axially extending attachment lip 262, which extends from the hub body 258, towards the axial end 238*b* of the drive assembly 234*a*, and terminates at an axial end region 262*a*. Generally, the attachment lip 262 includes a cylindrical outer surface, with the end region 262*a* being radially stepped toward the axial end 238*a* of the drive assembly 234*a* so as to define a short axially extending annular, attachment lip portion 264 having an open space provided radially therebeneath for a purpose described below.

As depicted, the output hub 256 is coupled to a drive sprocket 265 configured to engage (directly or indirectly) the tracks 32 of the vehicle 30, such that rotation of the output hub 256 may drive the tracks 32 and, thereby, cause movement of the vehicle 30. In other embodiments, other output interfaces may be utilized to engage with the tracks 32 or other external devices.

The drive assembly 234*a* may further include a housing, such as a housing cylinder 270 including interior gear teeth 280 extending a major portion of an axial length of the housing cylinder 270 such that the housing cylinder defines a planetary ring gear having an outer cylindrical surface having a diameter matching that of the cylindrical outer surface of the annular attachment lip 262 of the output hub 256. Generally, the housing cylinder 270 of the disclosed drive assembly 234*a* may be configured to engage with an attachment lip of the relevant output interface, such that rotational power may be transmitted from the housing to the output interface via co-rotation (i.e., rotation in unison) of the housing and the output interface. As depicted, for example, a hub end of the housing cylinder 270 is defined by an axial hub end region 270*a*, which is stepped radially inwardly and axially toward the axial end 238*a* of the drive assembly 234*a* so as to define a short annular attachment lip portion 271 configured to fit within the space radially inward of the annular lip portion 264 and overlap the lip portion 264 with an outer diameter of the lip portion 271 being in engagement with an inner diameter of the lip portion 264 of the attachment lip 262*a* of the output hub 256. At an end opposite from the end region 270*a*, the housing cylinder 270 has a cap end 270*b*, to which an end cap 272 is attached.

The hub end region 270*a* of the housing cylinder 270 may be configured to attach to the axial end region 262*a* of the attachment lip 262 by being welded in various ways, as discussed in greater detail below. In certain embodiments, respective radially outer first steps of the annular lip portion 264 of the end region 262*a* of the attachment lip 262 and the annular lip portion 271 of the stepped hub end region 270*a* of the housing cylinder 270 may be configured such that an annular groove 273 is provided between the radially outer first steps for receiving weld material for creating an appropriately strong weld joint 275 whereby the attachment lip region 262*a* of the output hub 256 is joined to the attachment lip region 270*a* of the housing cylinder 270. A variety of commercial welding techniques may be used including: MIG, Tig, Friction Welding or Electron beam welding.

As depicted, the space radially beneath the annular lip portion 264 provides a point of insertion for the annular lip portion 271 of the housing cylinder 270. The housing cylinder 270 may accordingly be attached to the output hub 256 by inserting the hub end region 270a of the housing cylinder 270 into the space located radially inside the lip portion 64, with the outer cylindrical surface of the attachment lip 262 being axially aligned with the cylindrical outer surface of the housing cylinder 270. In certain embodiments, a somewhat reversed configuration (not shown) may be utilized. For example, the hub end region 270a of the housing cylinder may be stepped axially in the direction of the axial end 238b of the drive assembly 234a and the axial end region 262a of the attachment lip 262 may be stepped axially in the direction of the axial end 238a of the drive assembly 234a such that the annular lip portion 271 slides over (i.e., is radially outside of) the annular lip 262 portion 264. In such a configuration, the overlapping lip portions 262, 271 have respective radially outer, axially confronting surfaces that cooperate to form an annular, radially outward opening groove for receiving weld material (not shown) that fixes the overlapping lip portions 264 and 271 together and thus joins the output hub 256 to the housing cylinder 270.

In certain embodiments, the output hub 256 and the housing cylinder 270 may be formed from different materials, or may be formed in different ways. For example, the output hub 56 may be formed from cast iron, whereas the housing cylinder 70 may be formed from steel (or other metal) tubing. This may result in relatively significant reduction in costs as compared to known drive assembly designs.

Rotational power may be transmitted in various ways from the motor 246 to the housing cylinder 270 and thereby, via the attachment between the attachment lip 262 and the hub end 270a of the housing cylinder 270, to the output hub 256. As depicted, a series of teeth 280 may be integrally (or otherwise) formed on an interior circumference of the housing cylinder 270, such that the housing cylinder 70 includes an interior ring gear interface 282. A gear set (e.g., a planetary gear set) utilizing the ring gear interface 282 may then be disposed within the housing cylinder 70 in order to provide an appropriate speed reduction between the rotation of the output shaft 248 (e.g., as powered by the motor 246) and the rotation of the housing cylinder 270 (e.g., as powers rotation of the output hub 256 and, thereby, the relevant external device).

As depicted, the drive assembly 234a includes an example double planetary gear set 284, with sun gears 286 and 288, sets of planet gears 290 and 292, and planet gear carriers 294 and 296. The planet gears 290 are meshed with the sun gear 286 and with the ring gear interface 282. The planet gears 292 are meshed with the sun gear 288 and with the ring gear interface 282. The planet gear carrier 294 is fixed to (e.g., secured to or integrally formed with) the sun gear 288, and the planet gear carrier 296 is fixed to (e.g., secured to or integrally formed with) an extended neck 298 of the mounting structure 244. With such a configuration, the sun gear 288 may be rotated by the planet gear carrier 294, via movement of the planet gears 290 around the sun gear 286, while the axes of rotation of the various planet gears 292 may be fixed in place via the connection between the planet gear carrier 296 and the neck 298. It will be understood, however, that other configurations may be possible. It will also be understood that the disclosed drive assembly may be considered as capable of providing power transmission with a planetary (or other) gear set that excludes a separate ring gear component other than the ring gear interface provided by the housing cylinder. Thus, for example, the planetary gear set may include only one or more of each of a sun gear, planet gears, planet carrier, and or connecting pinion shafts, without a separate ring gear. Alternatively, the planet (or other) gear set may include a separate ring gear in addition to the ring gear(s) formed in the housing cylinder.

With the depicted planetary gear set 284, rotational power may be routed from the motor 246 to the housing cylinder 270 as indicated by the unnumbered arrows of FIG. 2. For example, when the sun gear 286 is rotated by the motor 246 (i.e., via the output shaft 248) rotational power is transmitted by the sun gear 286, through the planet gears 290, both to the sun gear 288 (via the planet gear carrier 294) and to the housing cylinder 270 (via the ring gear interface 282). Rotational power received at the sun gear 288 is further transmitted to the housing cylinder 270 via the planet gears 292 (as facilitated by the fixed connection between the planet gear carrier 296 and the neck 298) and the ring gear interface 282. Due to the attachment between the housing cylinder 270 and the output hub 256 (e.g., as described in greater detail above), rotational power from the housing cylinder 270 may then be transmitted to the output hub 256 and, thereby, to the relevant external device.

As depicted, the ring gear interface 282 is disposed on the housing cylinder 270 such that, when the hub end 270a of the housing cylinder 270 is welded to the output hub 256 via the attachment lip 262, the ring gear interface 282 is not radially aligned (i.e., does not axially overlap) with the attachment lip 262. Further, the planetary gear set 284 is configured such that the various gears 286, 288, 290, and 292 are also not radially aligned with the attachment lip 262, when the housing cylinder 270 is welded to the output hub 56. In other embodiments, other configurations may be possible.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly for transferring power to an external device, the drive assembly comprising:
   a housing cylinder mounted for rotation about a drive axis and having a cap end and an attachment end disposed entirely at an opposite end of the housing cylinder from the cap end, with the attachment end including an annular first attachment surface, and gear teeth disposed around an inner circumference of the housing cylinder to form at least one ring gear;

a planetary gear set surrounded, at least in part, by the housing cylinder, and including at least one sun gear and at least one set of planet gears supported by at least one planet gear carrier, rotated by the at least one sun gear and meshed with the at least one ring gear;

an output interface having an annular attachment lip extending axially and including an annular second attachment surface overlapping and being in contact only with the first attachment surface, with an axial end of the attachment lip terminating radially adjacent the first attachment surface;

a welded connection being established between the attachment end of the housing cylinder and the attachment lip of the output interface adjacent the annular first and second attachment surfaces wherein the housing cylinder is attached for transferring rotation to the attachment lip during operation of the drive assembly; and wherein rotational power is transmitted from the planetary gear set to the output interface, via the gear teeth and the connection between the first and second attachment surfaces, in order to drive the external device.

2. The drive assembly, as defined in claim 1, wherein the housing cylinder has an outer cylindrical surface and the annular attachment lip has an outer cylindrical surface that is axially aligned with the outer cylindrical surface of the housing cylinder.

3. The drive assembly, as defined in claim 1, wherein the attachment end of the housing cylinder is radially inwardly stepped axially in a direction away from the cap end of the housing and wherein the attachment lip of the output interface is radially inwardly stepped in a direction toward the cap end of the housing, with a first step of each of the attachment end and attachment lip being shaped for cooperatively defining an annular V-shaped groove as a site where a welding technique is to be performed.

* * * * *